Patented Feb. 19, 1946

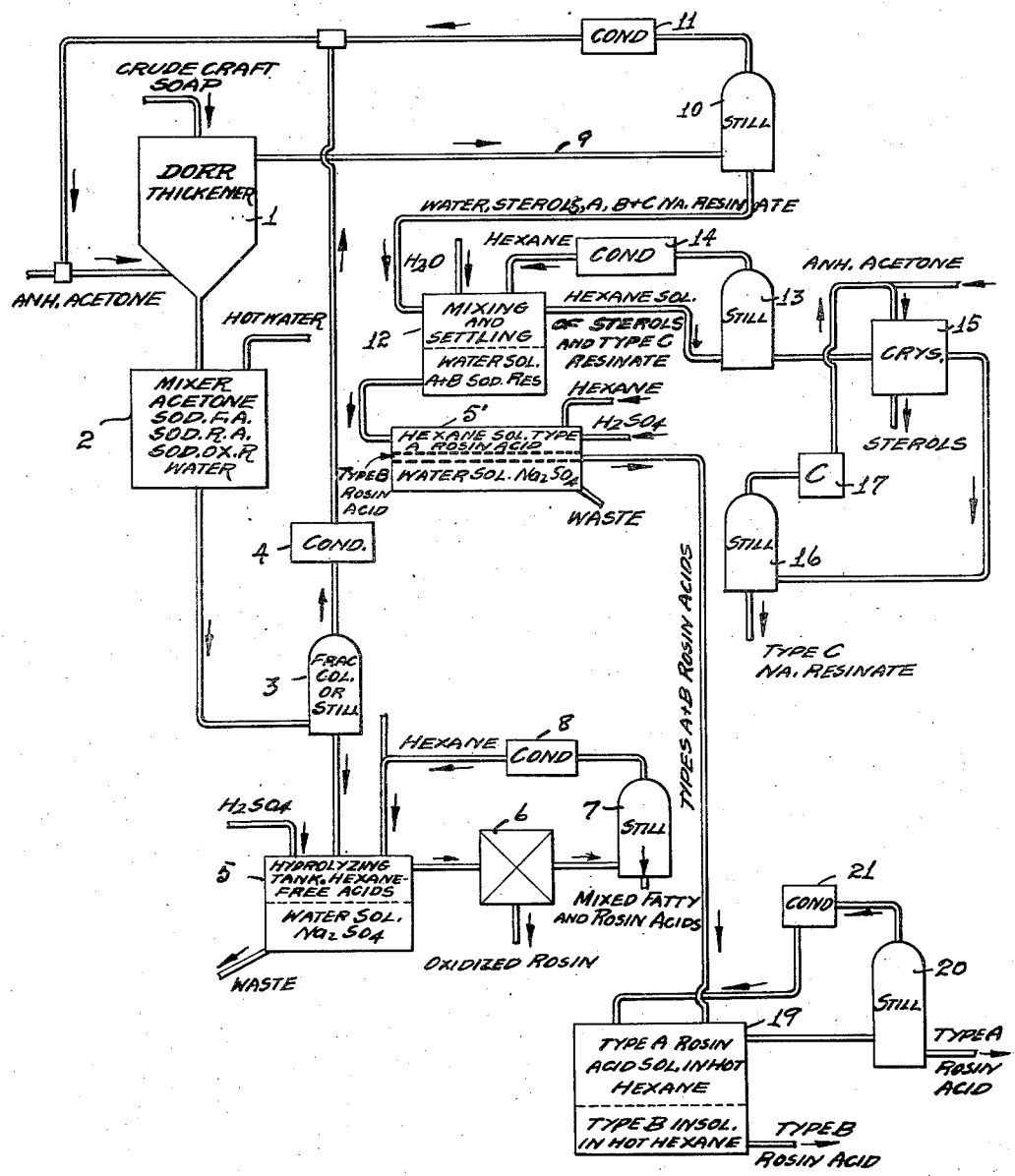

2,395,283

UNITED STATES PATENT OFFICE 2,395,283

METHOD OF TREATING CRUDE KRAFT SOAP

Joseph John Lovas, Ridgewood, and Paul F. Bruins, Douglaston, N. Y.

Application August 1, 1942, Serial No. 453,289

6 Claims. (Cl. 260—97.5)

The present invention relates to an improved method of and means for treating crude kraft pulp mill soap in order to separate out and recover therefrom its component substances. Crude kraft pulp mill soap is obtained from the waste black liquor of the soda and sulfate processes of pulping coniferous woods, and is made up of the following components—sodium salts of fatty acids, principally sodium oleate with smaller quantities of sodium linoleate and sodium linolenate. Sodium salts of at least three types of rosin acids which can be classified as follows:

Type A—Hexane soluble rosin acid;
Type B—Hexane insoluble rosin acid;
Type C—Rosin acid, the sodium salt of which is soluble in hexane and in anhydrous acetone.

In addition to the above named sodium salts, the crude soap also contains oxidized rosin compounds and sterols.

In an application filed by us of even date herewith Ser. No. 453,288, there is disclosed a method of and means for separating the sodium salts of fatty acids and the sodium salts of types A and B rosin acids, from the oxidized rosin acids, sterols, and the sodium salts of type C rosin acid, and then for separating each of the components from one another. Other procedures are also disclosed therein including one example which briefly outlines the particular method forming the basis of this application.

In the present case, there is disclosed a method of and means for first separating the sterols, type C sodium resinate, and some sodium salts of types A and B rosin acids, from the sodium salts of the fatty acids, the amount of types A and B thus separated depending on the amount of water present, then hydrolyzing the acid mixed salts into a mixed fatty and rosin acid, then separating these acids from associated materials and separating the sterols and type C sodium resinate from the types A and B sodium resinates, separating the sterols from the type C resinate, and hydrolyzing and separating the type A rosin acid from the type B rosin acid.

Referring to the annexed flow sheet diagram, we take ordinary crude kraft soap (usually containing between 25% and 40% water) and spray dry it to reduce the water content thereof to within 0.5% to 5% water. The dried material is conveyed into the top of a Dorr thickener 1, and preferably warm and substantially anhydrous acetone is fed into the bottom in the proportion of approximately 3–10 pounds of acetone to 1 pound of dry material. For economical commercial operation, this process could readily be converted to continuous operation by a continuous feed of dried soap and acetone. The susbtantially anhydrous acetone acts as a solvent for the sterols and type C sodium resinate and some of the type A and B sodium resinates. The action of the thickener is to collect all of the acetone insoluble sodium salts of the fatty and rosin acids as a sludge at the bottom, while acetone solution is decanted from the top as a clear solution. The sludge is piped from the bottom of the thickener to a mixing chamber 2, where hot water is added. The hot water dissolves the sodium salts of the fatty and rosin acids and the oxidized rosin compound. The solution in chamber 2 is sent to a fractionating column or still 3 where acetone vapors are distilled off, condensed in condenser 4, and collected for re-use.

After the acetone has been removed, the water solution from still 3 is transferred to a hydrolyzing tank 5 where a mineral acid such as sulfuric acid is added to hydrolyze the sodium salts of the fatty and rosin acids. Hexane or other suitable low boiling hydrocarbon is added to dissolve the free acids resulting from the hydrolysis and precipitate the oxidized rosin. There are then two layers in tank 5, a hexane solution of the free acids above a lower layer of a water solution of sodium sulfate. The lower layer is drained out, leaving an upper layer which is put through a filter 6 to filter out the hexane-insoluble oxidized rosin together with other impurities. The hexane filtrate containing the free acids is put in a still 7 where the hexane is distilled off, condensed in condenser 8 and re-used, the free fatty and rosin acids come out as "mixed acids" which may be further worked or separated. As an alternative, the sludge may be drawn off from the extractor, and the acetone stripped therefrom to produce a soap containing chiefly sodium fatty acids, with a smaller portion of sodium resinates and a still smaller portion of oxidized rosin soap. Such a final soap product can be utilized for blending for the production of certain grades of soaps, for example laundry soaps.

The acetone solution of the sterols and type C sodium resinate and some of the type A and B sodium resinates, which was decanted from the Dorr thickener 1, is treated as follows—

The solution is piped 9 to a fractionating column 10 where the acetone is distilled off, condensed in condenser 11, and re-used. The residue of sterols and type C plus small amounts of types A and B sodium resinates, is then dissolved in water in a mixing chamber 12 and hexane is added. The hexane extracts sterols and type C sodium resinate from the solution, while types A and B sodium resinates remain dissolved in the water solution. On standing, the hexane solution forms a layer above the water solution. The amount of type A and B resinates present in the water solution will increase proportionately as the concentration of water in the original acetone or other ketone used is increased.

The top layer may be decanted off or the lower layer drained from the bottom, as may be preferred. The top layer is transferred to a still 13 where the hexane is distilled off, condensed, 14, and recirculated. The remaining sterols and type C resinate are then placed in a crystallizer 15 where warm anhydrous acetone is added. The sterols crystallize out on cooling while the type C resinate remains in solution in the anhydrous acetone. The latter solution is then piped into a still 16 where the anhydrous acetone is driven off, condensed, 17, and recirculated. The material remaining in the still 16 after the distillation off of the acetone is type C sodium resinate, which is insoluble in cold water but emulsifies in hot water. This type C sodium resinate can be used "as is" as a carrier for insecticide sprays since it is insoluble in cold water and can be emulsified in hot water, or it may be hydrolyzed to produce a very tacky (sticky) form of rosin acid, which may be valuable as an adhesive.

Returning to chamber 12, the lower layer comprising types A and B sodium resinates in solution in water, is piped to a hydrolyzer 5', where sulfuric acid and hexane are added. The acid hydrolyzes types A and B resinates to their free acids. The hexane is a solvent for type A rosin acid but not for type B rosin acid. But type B rosin acid is also insoluble in water so there are three layers formed in the hydrolyzer, the top one consisting of a hexane solution of type A free rosin acid; a middle layer or suspension of type B rosin acid alone, and a bottom layer comprising a water solution of sodium sulfate. The two upper layers may be decanted off and are placed in a vessel 19. The solution of hexane containing type A rosin acid is then placed in a still 20 where the hexane is distilled off, condensed, 21, and recirculated.

Types A and B sodium resinates in solution in water may, if desirable, be concentrated to form a dark brown syrupy water solution of sodium resinates suitable for use as a rosin size, for example, in sizing papers such as kraft papers. If it is further desired, this concentrated syrup of sodium resinates may be dried to a solid or powder form, as by spray drying.

The above procedure, therefore, results in recovering from the crude kraft soap, as end products of the process, white crystals of substantially pure sterols, chiefly sitosterols; a hydrocarbon soluble sodium resinate (type C); a rosin acid (type A) which is soluble in hot hexane and a rosin acid (type B) which is insoluble in hot hexane; fatty and rosin acids; and a small amount of hexane-insoluble oxidized rosin.

The fatty acids may be separated from the rosin acids by a process which forms the subject matter of our above mentioned copending application.

It has heretofore been stated that the ordinary crude kraft soap may be dried to reduce the water content to upwards of 5% water. Likewise, the ketone, of which acetone is our preferred form, may contain some water. We prefer that the total or combined water content not exceed 10% of the whole, and it is always best that the process be operated in the absence of any substantial amount of water in the crude soap. When any substantial amount of water is present in the crude kraft soap, when it is added to the Dorr thickener, then a dissolving action will be had upon the sodium fatty acid soap, whereas, in our process, it is desired that said soap remain undissolved until it is passed to the mixing tank. Normally the operation will be conducted with 97–100% ketone, and the range 95–100% ketone is included in "substantially anhydrous ketone."

Any ketones, in which water is soluble, or at least slightly soluble, may be employed in our process. In the examples, acetone and methyl ethyl ketone (maximum water solubility about 11% water) were specified, but in general, ketones with a structure containing up to 8 or 9 carbon atoms may be used and, as examples, we may mention di-ethyl ketone (slightly water soluble) and ethyl propyl ketone (very slightly water soluble). Water is generally insoluble in the higher ketones.

The mixture of fatty acids and rosin acids as produced and covered by this method will contain between about 55% and 95% fatty acids and between about 5% and 45% rosin acids, the fatty acid content depending upon the water present during the ketone extraction. For example, when using anhydrous acetone having a ketone content of 99.5% and dried soap having a moisture content of about 2%, the final mixed acid will be found to analyze approximately 55–60% fatty acid and about 45–40% rosin acids. As a further example, when using acetone with a ketone content of 97% by weight and a similar dried soap of 2% moisture content, the final mixed acid product will be found to analyze approximately 80–90% fatty acid content and about 20–10% rosin acid content.

In general, the more water present, the higher will be the fatty acid content and the lower the rosin acid content of the final mixed acids. The mixed acid product recovered will be found to be clear and stable and have no offensive odor such as was originally present in the original raw material used. The odor of the product will be similar to that of oleic acid. The quality of this finished mixed acid product will also be found to be very high since it will be substantially free from unsaponifiable matter, oxidized rosins and undesired sulfur compounds. The product is of such high grade that it may be readily adapted and used for direct hydrogenation for the production of stearic acid and also for the production of fatty acid esters by direct esterification. It may also be used directly by saponification for the production of high grade cold water soluble soaps which are suitable for use in the textile industry as well as in synthetic rubber and synthetic resin polymerizations. The product may also be used directly for the production of vinyl esters of carboxylic acids for use in synthetic resin polymerizations. The particular fatty acids present in this mixed acid product are chiefly water-insoluble, unsaturated, fatty acids having 12 or more carbon atoms to the molecule having a molecular weight of at least 250 and a boiling point of at least 200° C. at 50 mm. When using some types of crude kraft soap in the manner described, the final mixed acid product sometimes contains a small amount or traces of water-insoluble, saturated fatty acids having a molecular weight of at least 250.

Having described our invention, what we claim and desire to secure by Letters Patent is as follows:

1. The process of treating a dried crude kraft soap which comprises adding thereto substantially anhydrous liquid aliphatic ketone of not more than 9 carbon atoms per molecule and thereby dissolving sterols, other unsaponifiables, and also the ketone soluble sodium resinates, and removing the undissolved sodium salts of fatty and rosin acids and oxidized rosins.

2. The process of treating dried crude kraft soap which comprises feeding said dried material to an extractor while feeding into the bottom of the extractor substantially anhydrous aliphatic ketone of not more than 9 carbon atoms per molecule, collecting an overflow containing sterols, other unsaponifiables, and the ketone soluble sodium resinates, in ketone solution, and removing the undissolved sodium salts of fatty and rosin acids and oxidized rosins.

3. The process of treating dried crude kraft soap which comprises adding thereto substantially anhydrous aliphatic ketone of not more than 9 carbon atoms per molecule, separating the thereby dissolved portion from the undissolved portion, dissolving the latter in hot water, removing the ketone from the resulting solution, adding acid to the solution in the presence of water to hydrolyze the sodium salts of fatty and rosin acids, adding hexane to take up the free acids, and separating out the materials not dissolved by the hydrocarbon, and removing the hydrocarbon to recover the mixed free fatty and rosin acids.

4. A process of treating dried crude kraft soap which comprises adding thereto substantially anhydrous aliphatic ketone of not more than 9 carbon atoms per molecule, separating the dissolved portion from the undissolved portion, removing the ketone from the dissolved portion and adding water to the ketone-free solution, then adding hexane and mixing the same with the solution to form two layers, a hydrocarbon layer and a water layer containing sodium resinates, separating the layers, treating the water layer with a mineral acid to hydrolyze the sodium resinates, adding to the hydrolyzed resinates hexane to form three layers (1) rosin acids dissolved in the hydrocarbon, (2) rosin acid insoluble in the hydrocarbon, and (3) a water layer, removing the rosin acid layers from the water layer, and separating the rosin acid hydrocarbon-insoluble layer from the soluble layer, and stripping the hydrocarbon from the other layer.

5. The process of treating dried crude kraft soap which comprises adding thereto substantially anhydrous aliphatic ketone of not more than 9 carbon atoms per molecule and thereby dissolving the ketone-soluble constituents of the soap, separating said dissolved portion from the undissolved portion and adding water to the latter, stripping said water solution of ketone, adding mineral acid to said water solution, whereby the sodium fatty acid salts and rosin acid salts, including oxidized rosin acid salts of said solution are hydrolyzed to their free acid components, adding a hexane whereby the said acids are brought into solution and the oxidized rosin is precipitated, separating out the oxidized rosin and removing the solvent from the said acids.

6. A process, in accordance with claim 1, in which the ketonic solution containing sterols, other unsaponifiables and sodium resinates is substantially stripped of the ketone solvent, followed by the steps of adding water to the ketone-free solution, then adding hexane and mixing the same with the solution to form two layers, a hydrocarbon layer and a water layer, separating the layers, stripping the hydrocarbon from its layer, adding substantially anhydrous ketone to the said hydrocarbon-freed layer, chilling said layer to crystallize out the sterols and stripping the ketone from the remaining material to produce a residue consisting of sodium resinate.

JOSEPH JOHN LOVAS.
PAUL F. BRUINS.